United States Patent
Enrico et al.

(10) Patent No.: US 12,003,619 B2
(45) Date of Patent: Jun. 4, 2024

(54) USER APPARATUS AND METHOD FOR THE PROTECTION OF CONFIDENTIAL DATA

(71) Applicants: POLITECNICO DI TORINO, Turin (IT); TOOTHPIC S.R.L., Turin (IT)

(72) Inventors: Magli Enrico, Turin (IT); Coluccia Giulio, Grugliasco (IT); Valsesia Diego, Borgomanero (IT); Bianchi Tiziano, Prato (IT)

(73) Assignees: Politecnico Di Torino, Turin (IT); Toothpic.S.R.L., Turin (IT)

( * ) Notice: Subject to any disclaimer, the term of this patent is extended or adjusted under 35 U.S.C. 154(b) by 0 days.

(21) Appl. No.: 16/883,236

(22) Filed: May 26, 2020

(65) Prior Publication Data
US 2020/0382308 A1  Dec. 3, 2020

(30) Foreign Application Priority Data
May 27, 2019  (IT) .................. 102019000007290

(51) Int. Cl.
| | | |
|---|---|---|
| H04L 9/32 | (2006.01) | |
| G06F 21/60 | (2013.01) | |
| H04L 9/06 | (2006.01) | |
| H04L 9/08 | (2006.01) | |

(52) U.S. Cl.
CPC ......... *H04L 9/0662* (2013.01); *G06F 21/602* (2013.01); *H04L 9/0866* (2013.01); *H04L 9/0869* (2013.01); *H04L 9/3231* (2013.01)

(58) Field of Classification Search
CPC ... H04L 9/3231; H04L 9/0866; H04L 9/0869; G06F 21/602; G06K 9/209
See application file for complete search history.

(56) References Cited

U.S. PATENT DOCUMENTS

| | | | | |
|---|---|---|---|---|
| 7,017,182 | B2* | 3/2006 | Kiyomoto | G06F 21/606 713/186 |
| 8,730,372 | B2* | 5/2014 | Dabov | H04N 23/55 348/250 |
| 9,225,512 | B1* | 12/2015 | Trimberger | H04L 9/0866 |
| 9,787,670 | B2* | 10/2017 | Kim | G09C 1/00 |
| 10,915,464 | B2* | 2/2021 | Chen | H10B 20/20 |

(Continued)

FOREIGN PATENT DOCUMENTS

WO   WO-2018073681 A1 *  4/2018  ............ G06F 21/32

OTHER PUBLICATIONS

Arjona, et al.; "Trusted Cameras on Mobile Devices Based on SRAM Physically Unclonable Functions"; 2018, Sensors, MDPI Journal. pp. 1-21 (Year: 2018).*

(Continued)

*Primary Examiner* — John B King
*Assistant Examiner* — Alex D Carrasquillo
(74) *Attorney, Agent, or Firm* — Workman Nydegger

(57) ABSTRACT

A method and a user apparatus for the protection of confidential data, wherein the apparatus includes an image sensor and a processor configured for: capturing a plurality of images by way of the image sensor, generating a sensor fingerprint on the basis of the plurality of images, encoding at least a portion of the sensor fingerprint using an algorithm (Continued)

of random projections in such a way as to generate a compressed fingerprint, encrypting and/or decrypting the confidential data using the compressed fingerprint as a key.

11 Claims, 5 Drawing Sheets

(56) References Cited

U.S. PATENT DOCUMENTS

| | | | | |
|---|---|---|---|---|
| 10,990,660 | B2* | 4/2021 | Magli | H03M 13/13 |
| 2013/0141137 | A1* | 6/2013 | Krutzik | G09C 1/00 |
| | | | | 326/8 |
| 2014/0376717 | A1* | 12/2014 | Macchetti | H04L 9/0866 |
| | | | | 380/28 |
| 2015/0143130 | A1* | 5/2015 | Ducharme | H04L 9/3278 |
| | | | | 713/189 |
| 2016/0352520 | A1* | 12/2016 | Schwach | G09C 5/00 |
| 2016/0373264 | A1* | 12/2016 | Katoh | H10N 70/24 |
| 2017/0169293 | A1* | 6/2017 | Valsesia | G06K 9/44 |
| 2019/0356491 | A1* | 11/2019 | Herder, III | H04L 9/0637 |

OTHER PUBLICATIONS

Valsesia, et al.; "Compressed Fingerprint Matching and Camera Identification via Random Projections", Jul. 2015, IEEE, Information Forensics vol. 10, No. 7; pp. 1-14 (Year: 2017).*

Cao, et al.; "CMOS Image Sensor Based Physical Unclonable Function for Coherent Sensor-Level Authentication"; Nov. 2015, IEEE, Circuits and Systems, vol. 62, No. 11, pp. 1-12 (Year: 2015).*

Lu et al. "Physical Layer Encryption Algorithm Based on Polar Codes and Chaotic Sequences", IEEE, 2018) (Year: 2018).*

Chen "Secret Key Generation Over Biased Physical Unclonable Functions With Polar Codes", IEEE, IoT Journal, 2018 (Year: 2018).*

Lu et al.; "Physical Layer Encryption Algorithm Based on Polar Codes and Chaotic Sequences", IEEE Access, vol. 7, pp. 4380-4388, 2018) (Year: 2018).*

Chen, "Secret Key Generation Over Biased Physical Unclonable Functions with Polar Codes", IEEE, Internet of Things Journal, vol. 6, No. 1, pp. 435-444, 2019 (Year: 2019).*

* cited by examiner

USER APPARATUS AND METHOD FOR THE PROTECTION OF CONFIDENTIAL DATA

CROSS REFERENCE TO RELATED APPLICATIONS

This application claims priority to Italian Application No. 102019000007290, filed May 27, 2019, which is incorporate herein by specific reference.

BACKGROUND OF THE INVENTION

1. The Field of the Invention

The present invention refers to a user equipment; like a smartphone, a tablet, a personal computer, a laptop, or other) and to a method for the protection of confidential data; in particular for encrypting/decrypting a private cryptographic key.

2. The Relevant Technology

As known, electronic authentication systems according to the state of the art are based on asymmetric cryptography techniques. The use of these techniques requires that each user/device be assigned as pair of (pseudo) randomly-generated strings called keys, i.e., a 'public key' and a 'private key'. The private key is the (unshared) secret that makes it possible to authenticate the user/device. It must be protected by the user/device and never shared publicly. On the other hand, the public key is the information that the user can and must disclose to allow the operation of systems based on this type of cryptography. For example, in the case in which user A wishes to send user B an encrypted message, user A must be in possession of the public key of B, with which he/she encrypts the message and sends it to user B. User B, being the only subject in possession of his/her private key, is the only subject capable of decoding the message; indeed, the decoding of the message encrypted with the public key of B can only take place through the private key of user B.

Another example in which asymmetric cryptography techniques are used for authentication is that in which the so-called 'digital signature' is used, which allows a user A to verify the identity of user B. In this scenario, user A sends user B a message, called challenge, after which user B signs the challenge using his/her own private key, and sends the signed message to user A. User A, in possession of the public key of user B, can verify the identity the identity thereof by verifying the signature of user B and the consistency of the message with the public key.

There are different solutions according to the state of the art for protecting the private key, like storage on dedicated removable hardware (for example a USB token, a smart card, a hardware ledger for cryptocurrency or other), storage on non-volatile memory (plaintext or encrypted), executing applications that can access such a key in a "Trusted Execution Environment", storage in a dedicated cryptographic chip (also known by the term Secure Element) contained inside a smartphone, and cloud storage.

Each of these systems just listed does, however, have problems and/or vulnerabilities. Indeed, storage on dedicated external hardware has the drawback that the user must carry all the necessary hardware with them (the token to access the service, the token for signing, the smartcard, the smartcard reader, etc.). Moreover, the dedicated hardware might not be general purpose, i.e., it could only allow certain operations, or only with the keys preloaded in the manufacturing step. Moreover, it could have interfacing problems; indeed, it is very often impossible to connect a USB token to a smartphone.

Storage in plaintext in the local memory of the device, on the other hand, is vulnerable to any malicious user in possession of the access credentials to the device.

Encrypted storage on local non-volatile memory is vulnerable to any malicious user in possession of the access credentials to the device and capable of making a copy of the memory and decrypting the content of the memory (offline).

Executing applications that can access such a key in a Trusted Execution Environment, i.e., in a virtualized area of the processor and of the RAM of the device, not accessible to all applications of the system, but only to those expressly made, has lower flexibility in making applications, since greater security corresponds to less possibilities for third party applications and to greater memory and calculation power requirements to make the virtual environment; moreover, the trusted execution environment offers more "attack surface", since, being based on a software implementation, it can be changed (malevolently) providing suitable privileges.

Storage in a dedicated cryptographic chip has the drawback of being not very flexible as already described for dedicated external hardware. Updatable versions of such cryptographic chips, on the other hand, have vulnerabilities. Indeed, the data inside them are written on overwritable memory, making it still possible to create clone (as is possible for trusted execution environments).

Cloud storage of data requires connection to the Internet and also requires that the servers on which the keys are kept are secure (security level that can be trusted, since the apparatuses in which storage physically occurs are not under the direct control of the user who owns the keys).

It is clear how these vulnerabilities allow a third person to carry out so-called electronic identity theft, allowing said third person to enact their criminal intentions, like transferring money from the user's bank account to another account, sending emails from the user's account to all of the other addresses present in the user's address book, minimizing the effects of anti-spam filters, sending the stolen identity to another person, or other.

SUMMARY OF THE INVENTION

The present invention proposes to solve these and other problems by providing a method for the protection of confidential data according to the attached claims.

Moreover, the present invention also provides a user apparatus for the protection of confidential data according to the attached claims.

The idea at the basis of the present invention is to configure a user apparatus so as to capture a plurality of images by means of an image sensor comprised in said apparatus, generate a sensor fingerprint on the basis of said plurality of images, encode at least a portion of said sensor fingerprint using an algorithm of random projections in such a way as to generate a compressed fingerprint, and encrypt and/or decrypt said confidential data using said compressed fingerprint as a key.

In this way, it is possible to increase the security of an authentication system; indeed, it is particularly complex (if not impossible) to carry out an identity theft by stealing an encrypted private key using a compressed fingerprint as a key, since in order to decrypt said encrypted private key it is necessary to possess the fingerprint of the image sensor that, in order to be determined needs to have access to the user terminal with sufficient access rights to use the image sensor of said user apparatus.

Moreover, in the case in which a third person (the attacker) manages to fraudulently generate a fingerprint of the image sensor (for example capturing photos shot by means of said sensor directly from the user terminal or from the Internet), it would still be possible to take the authentication system back into a secure state by using a new seed to generate a new compressed fingerprint through the algorithm of random projections, and encrypting a new private key using said new compressed fingerprint as a key.

It should also be highlighted that, by securely storing the keys in the user apparatuses, it is possible to advantageously use apparatuses already in the possession of the users, thus avoiding the purchase and management cost of dedicated hardware; moreover, this technical solution is very flexible, since it allows cryptographic keys to be protected at any moment of the life cycle of the device, for example allowing obfuscation of keys already in the possession of the users, so as to make it possible to use them universally in already operation authentication systems. Indeed, such a solution can be used as an additional level of security, capable of making it possible to use a key only if the fingerprint of the camera's sensor is available.

Further advantageous characteristics of the present invention are the object of the attached claims.

BRIEF DESCRIPTION OF THE DRAWINGS

These characteristics and further advantages of the present invention will become clearer from the description of an embodiment thereof shown in the attached drawings, provided only as a non-limiting example, in which.

DETAILED DESCRIPTION OF THE PREFERRED EMBODIMENTS

Reference to "an embodiment" within this description is meant to indicate that a particular configuration, structure or characteristic is comprised in at least one embodiment of the invention. Therefore, the terms "in an embodiment" and similar, present in different parts within this description, do not necessarily all refer to the same embodiment. Moreover, the particular configurations, structures or characteristics can be combined in any suitable way in one or more embodiments. The references used hereinafter are only for convenience and they do not limit the scope of protection or the reach of the embodiments.

Figure 1:
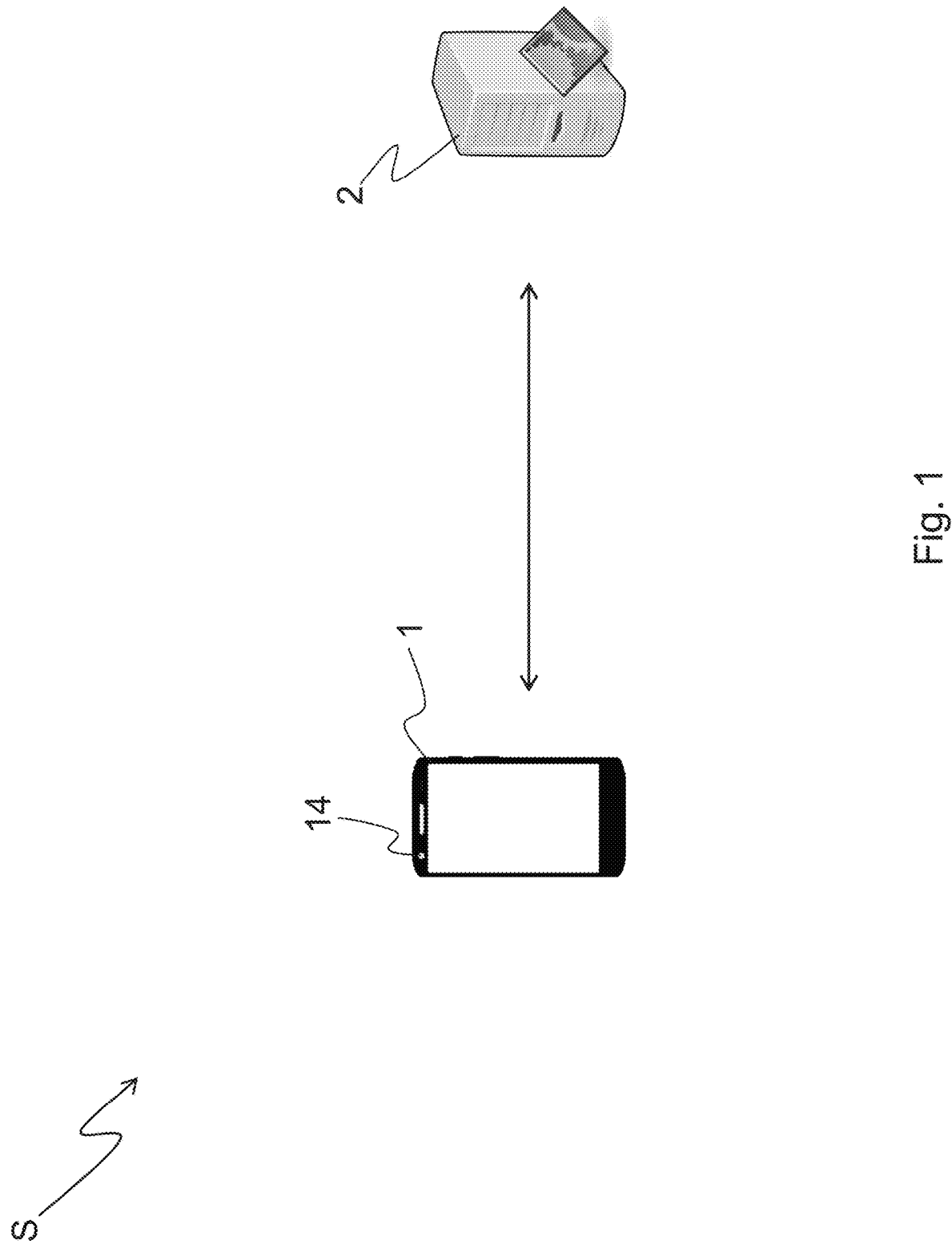
FIG. 1 illustrates an authentication system comprising a user apparatus according to the invention.

With reference to FIG. 1, an authentication system S will now be described, for example operating according to the WebAuthn standard (promoted by FiDO Alliance), in a typical usage scenario; such an authentication system S comprises the following parts:

- a user apparatus 1 according to the invention, like for example a smartphone, a tablet or other;
- an application server 2 adapted for delivering at least one service (like for example a social network, email, trading, home banking, e-commerce, online banking, cryptocurrency exchange, or other service) which requires the authentication of the user apparatus 1, i.e., that needs to ascertain that the user apparatus 1 is the same user apparatus with which a particular account has been associated during a registering phase (better described later in this description) and with which private and/or personal services are associated (for example access to one's current account or to that of a company, access to one's profile or to that of a company on a social networking service like Facebook, or other).

The user apparatus 1 and the application server 2 are in signal communication with each other through a data network, preferably a public data network (like for example Internet).

The application server 2 can consist of one or more servers suitably configured to form a cluster, and it is preferably configured to send the user apparatus at least one authentication request after the user apparatus 1 has requested from said application server 2 access to private and/or personal services, i.e., to services that require the authentication of said user apparatus 1; such an authentication request preferably comprises a string of characters (which represents for example the time of such a request) that the user apparatus 1 must return signed using its private signature, so that the application server 2 can authenticate said user apparatus 1 using the public key associated with said private key.

The user apparatus 1 comprises an image sensor 14 (like for example a photographic sensor, a night vision sensor, or other); such a user apparatus 1 can also alternatively consist of a personal computer, a laptop, or another electronic device in signal communication with an image sensor (like for example a webcam), preferably comprised (integrated) inside said device.

The application server 2 comprises some elements functionally similar to those of the user apparatus 1 (i.e., control and processing means, volatile memory means, mass memory means, communication means and input/output means) in signal communication with each other and configured to carry out different functions that will be described better later in this description; moreover, such an application server 2 can also coincide with the user apparatus 1 in the case in which the service that requires the authentication of the user apparatus 1 is carried out directly by said user apparatus 1.

Figure 2:
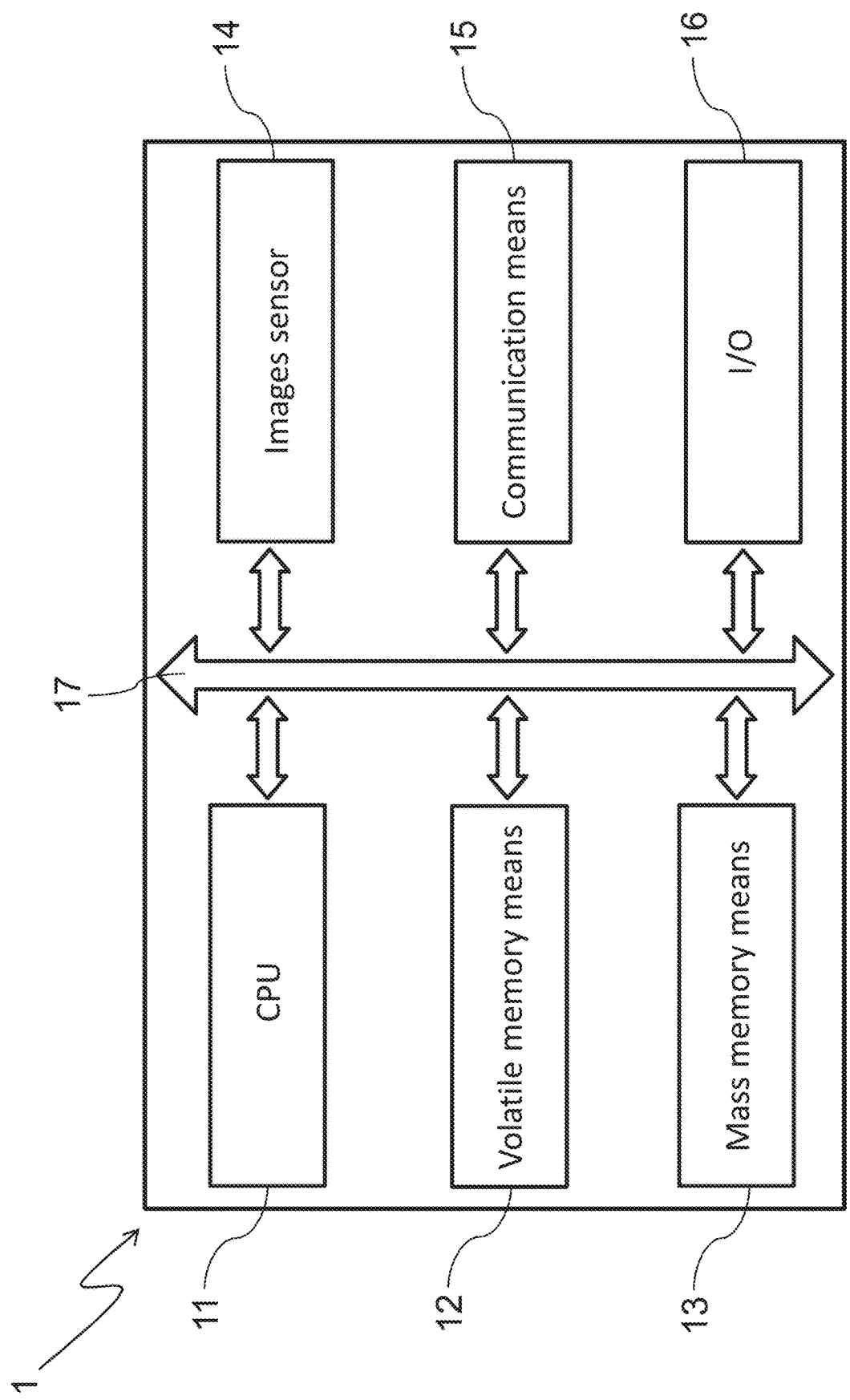
FIG. 2 illustrates a block diagram of the user apparatus of FIG. 1.

Also with reference to FIG. 2, the user apparatus 1 (like for example a smartphone, a tablet or other) according to the invention comprises the following components:

- control and processing means 11 (also called processing means), like for example one or more CPUs, which control the operation of the device 1, preferably in a programmable manner, through the execution of suitable instructions;
- volatile memory means 12, like for example a random access memory RAM, which is in signal communication with the control and processing means 11, and where in said volatile memory means 12 it is possible to store at least the instructions that implement the method according to the invention and that can be read by the control and processing means 11 when the device 1 is in an operating condition;

mass memory means 13, preferably one or more magnetic disks (hard disks) or a Flash type or other type of memory, which are in signal communication with the control and processing means 11 and with the volatile memory means 12;

the image sensor 14, like for example a photographic sensor, a night vision sensor, using infrared or other;

communication means 15, preferably a network interface that operates according to a standard of family 802.11 (known by the name WiFi), 802.16 (known by the name WiMax), IEEE 803.2 (also known by the name Ethernet) or an interface with a data network of the GSM/GPRS/UMTS/LTE, TETRA or other type, which allow the device 1 to communicate with other devices through a data network, where the latter will be described better later in this description;

input/output means (I/O) 16 that can for example be used to connect peripherals (like for example one or more interfaces that allow access to other mass memory means so as to preferably allow the copying of the information from these to the mass memory means 13) to said device 1 or to a programming terminal configured to write instructions (which the processing and control means 11 will have to execute) in the memory means 12,13; such input/output means 16 can for example comprise a USB, Firewire, RS232, IEEE 1284 or other adapter;

a communication bus 17 that allows the exchange of information between the control and processing means 11, the volatile memory means 12, the mass memory means 13, the image sensor 14, the communication means 15, and the input/output means 16.

As an alternative to the communication bus 17, it is possible to connect the control and processing means 11, the volatile memory means 12, the mass memory means 13, the image sensor 14, the communication means 15 and the input/output means 16 with a star-shaped architecture.

Figure 3:
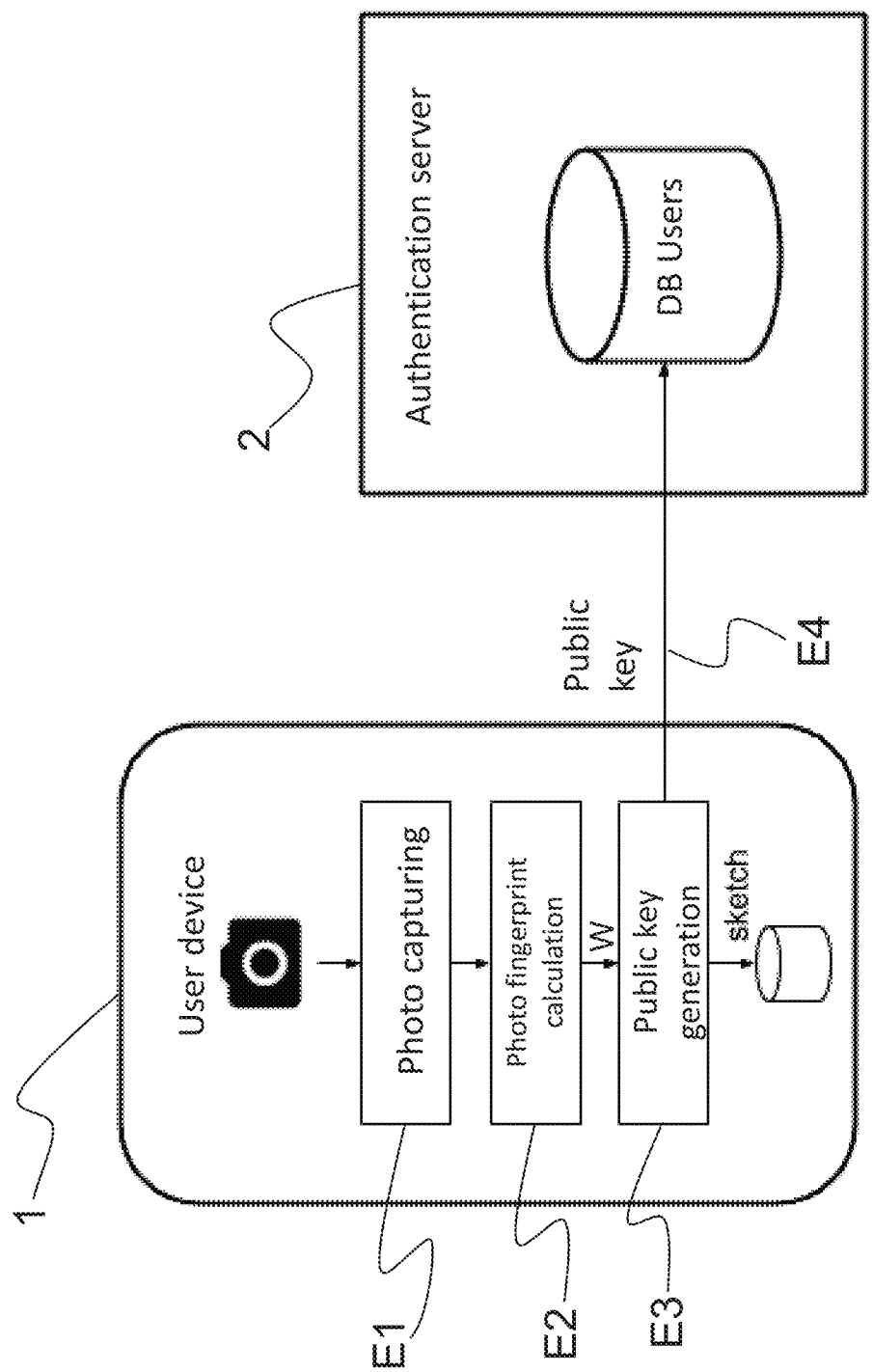
FIG. 3 illustrates a flow diagram that represents the operation of the system of FIG. 1 during a registering session.

Also with reference to FIG. 3, a typical scenario of use of the method and of the user apparatus 1 according to the invention will now be described in greater detail in which the steps of a method for registering said user apparatus 1 are carried out so as to subsequently make it possible to authenticate said user apparatus 1 at said device 1. The registering method, which is preferably carried out by said user apparatus 1, comprises the following phases:

an image acquisition phase E1, in which a plurality of images (preferably a number compatible with the calculation power provided by the processing means 11, for example a number comprised between 10 and 30 images) is captured by means of the image sensor 14, preferably in raw format (RAW) so as to make the defects of the image sensor 14 due to the impurities of the silicon portions of which it is made up clearer;

a registration fingerprint calculation phase E2, in which a registration sensor fingerprint is generated, through the processing means 11 of the user apparatus 1, on the basis of said plurality of images captured during said phase E1, and where said at least a portion of said registration sensor fingerprint is encoded (compressed), through the processing and control means of the user apparatus 1, using an algorithm of random projections, in such a way as to generate a compressed fingerprint W of said at least a portion of said registration sensor fingerprint. For example, the processing and control means of the user apparatus 1 are configured to carry out a set of instructions that implements said algorithm of random projections (which will be described better later in this description);

a key preparation phase E3, in which a copy of keys, i.e., a public key and a private key, is generated and the public key is transmitted to the application server 2, whereas the private key is encrypted, preferably through a symmetrical cryptography algorithm, using said compressed fingerprint W as a key, so as to generate an encrypted private key (also called 'sketch') that is stored in the memory means 12,13;

a public key transmission phase E4, in which the public key generated during phase E3 is transmitted to the application server 2 through the communication means 15 of said user apparatus 1, preferably through a protected channel (like for example an SSL or other connection).

Figure 4:
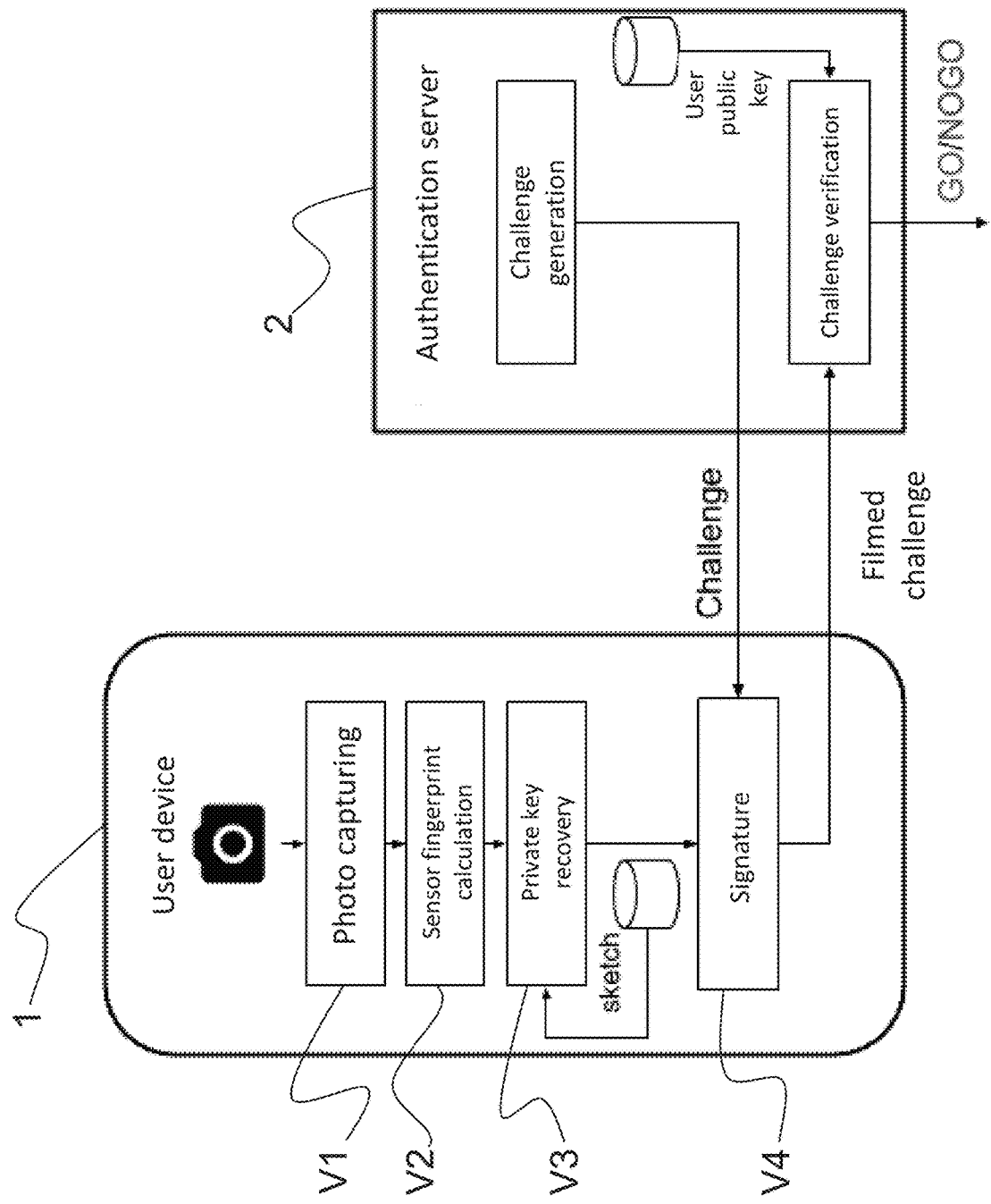
FIG. 4 illustrates a flow diagram that represents the operation of the system of FIG. 1 during an authentication session.

Also with reference to FIG. 4, a method for authenticating said user apparatus 1 at said application server 2 will now be described. The authentication method, which is preferably carried out by said user apparatus 1, comprises the following phases:

an image acquisition phase V1, in which at least one image (preferably a number of images compatible with the calculation power provided by the processing means 11, for example a number comprised between five and ten images) is captured through the image sensor 14, preferably in raw format (RAW) for the same reasons already outlined above;

an authentication fingerprint calculation phase V2, in which an authentication sensor fingerprint is generated, through the processing means 11 of the user apparatus 1, on the basis of said plurality of images captured during said phase V1 in a similar or the same way as phase E2 described above, so as to generate a compressed fingerprint W of at least a portion of said authentication sensor fingerprint;

a private key recovery phase V3, in which, through the processing means 11, the encrypted private key (also called 'sketch') is read by the memory means 12,13 and decrypted, preferably through a symmetrical cryptography algorithm homologous or identical to the one used during phase E3, using said compressed fingerprint W as a key, so as to recover the private key, i.e., obtain a plaintext copy of said private key;

a signature phase V4, in which an authentication request (i.e., a message also called 'challenge') is received by the application server 2, and the processing means 11 carry out the following steps:

generating an electronic signature on the basis of the authentication request carrying out a digital signature algorithm (like for example DSA, ECDSA, or other, i.e., an asymmetrical cryptography algorithm) that uses the private key as key;

transmitting, through the communication means 15, said electronic signature to the application server 2.

When the system S is in an operating condition, the elements 1, 2, 3 of said system preferably carry out the following steps:

the user apparatus generates a pair of keys, i.e., a public key and a private key, and is registered at the application server 2 transmitting its public key to it and storing its private key in the memory means 12,13;

the user apparatus 1 accesses the public services delivered by the application server 2 (for example accessing the "landing page" of the service delivered by said server 2) and transmits its user information requesting access to said at least one service that needs the authentication of said user apparatus 1;

the application server 2 generates an authentication request (the 'challenge') on the basis of the user information received from the user apparatus (for example creating a message that includes at least said user information) and transmits said authentication request to the device 1;

the user apparatus 1 carries out the following sub-steps:
  generating an electronic signature on the basis of the authentication request carrying out a digital signature algorithm (like for example DSA, ECDSA, or other, i.e., an asymmetrical cryptography algorithm) that uses (after having carried out the method according to the invention as described hereinafter) the private key as key;
  transmitting said electronic signature to the application server 2;

the application server 2 verifies the authenticity of the electronic signature received from said user apparatus 1 carrying out a digital signature verification algorithm (like for example DSA, ECDSA, or other, i.e., an asymmetrical cryptography algorithm) that uses the public key as key.

Figure 5:
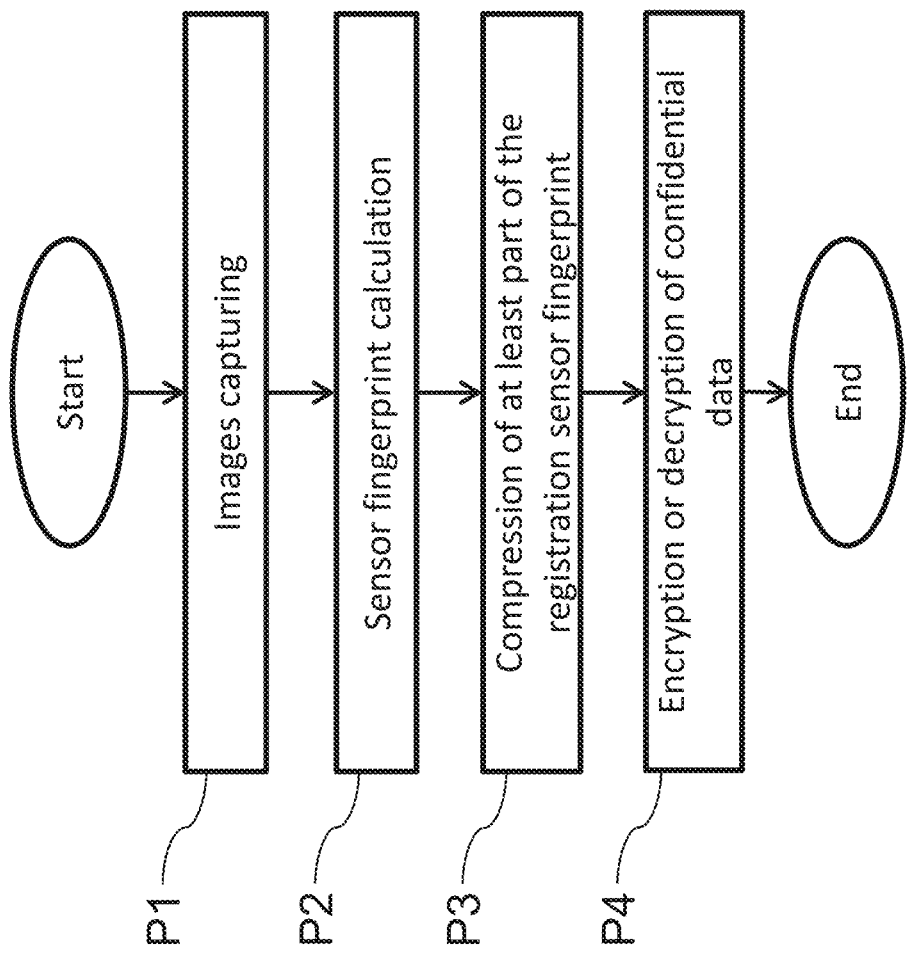
FIG. 5 illustrates a flow diagram that represents a method for the protection of confidential data according to the invention.

Also with reference to FIG. 5, the method according to the invention will now be described, specifically, which is carried out during the registering and authentication methods described above which can be generalized as a method for the protection of private data (like for example one or more private keys) comprising the following steps:
  an image acquisition phase P1, in which a plurality of images are captured by means of an image sensor 14;
  a fingerprint calculation phase P2, in which a sensor fingerprint is generated, by means of processing means 11, on the basis of said plurality of images captured during the image acquisition phase P1;
  a compression phase P3, in which at least a portion of said encoding sensor fingerprint is encoded, by means of said processing means 11, using an algorithm of random projections, in such a way as to generate a compressed fingerprint W;
  a processing phase P4, in which said confidential data are encrypted and/or decrypted using said compressed fingerprint W as a key.

In this way, it is possible to increase the security of an authentication system.

During each of the image capturing phases E1, P1 and V1, before carrying out the capturing of at least one of the images through the image sensor 14, the processing means 11 can carry out a set of instructions that generates a set of sensor control signals adapted for configuring the image sensor 14 to capture images, so that the images captured by said sensor allow the extraction of a higher quality sensor fingerprint, i.e., a sensor fingerprint less affected by noise. In this way, the repeatability of the extraction process is increased.

The sensor control signals encode shooting data that define shooting parameters as a focal distance, a sensor sensitivity (also known as ISO sensitivity) and an exposure time.

The processing means can be configured to determine, during one of the image capturing phases E1, P1 and V1, the focal distance that allows the image sensor 14 to capture an unfocused image of the surrounding environment. In greater detail, the processing means can be preferably configured to carry out the following steps:
  generating an estimated focal distance (for example carrying out a focal distance estimation algorithm according to the state of the art that uses a stream of low-resolution images captured by the image sensor 14) that allows said image sensor 14 to capture a clear image of the surrounding environment, i.e., captured by correctly setting the focal length;
  choosing a focal distance different from said estimated focal distance.

These steps can be implemented on a user apparatus 1 configuring it so as to select the capturing mode known as 'macro' (focal distance less than one meter) when the focal distance estimation algorithm indicates that the environment requires the use of an infinite focal distance (for example when the image sensor 14 is framing a landscape), and the capturing mode known as 'landscape' (infinite focal distance) when the focal distance estimation algorithm indicates that the environment requires the use of a focal distance less than one meter (for example when the image sensor 14 is framing detail of an object).

This reduces the high frequencies present in the images due to the surrounding environment (i.e., the entropy of the image), so that only the high frequencies produced by the physical defects of the sensor 14 remain in the image, thus increasing the repeatability of the extraction process of the sensor fingerprint.

In this way, the security level of the system S is increased, since the integration of the method according to the invention in already existing user apparatuses is simplified, since the reduction of the high frequencies due to the surrounding environment reduces the computing load, since less extraction attempts of the fingerprint are necessary.

In combination or as an alternative to what is described above, the processing means 11 can also be configured to determine, during one of the image capturing phases E1, P1 and V1, the exposure time and/or the sensor sensitivity to capture an image that does not contain saturation zones. In this way, the quality of the extracted fingerprint is increased, i.e., the repeatability of the extraction process is increased, advantageously requiring less extraction attempts and thus increasing the security level of the system S.

A possible approach for generating images from which it is possible to extract a good quality sensor fingerprint is that of lowering as much as possible the sensor sensitivity and increasing the exposure time up to the point in which very bright, but not saturated images are obtained. For example, it is possible to configure the processing means 11 to carry out the following steps:
  selecting a sensitivity value corresponding to the lowest possible value for the sensor 14, and setting such a value as shooting parameter;
  determining an estimated sensitivity value and an estimated exposure time value to obtain a well-exposed image, on the basis of the environment surrounding the image sensor 14, preferably using an algorithm well known in the state of the art, like for example a 3A algorithm (Auto-Exposure, Auto-Focus, Auto-White Balance);
  determining an exposure time on the basis of the selected sensor sensitivity, the estimated sensitivity value and the estimated exposure time value;
  setting said exposure time as shooting parameter for the image sensor 14.

Determining the exposure time can for example be carried out by multiplying the estimated exposure time value by a correction factor and by the ratio between the lowest possible sensitivity value and the estimated sensitivity value.

However, in the case in which carrying out the aforementioned steps produces an exposure time higher than a threshold value (for example because the environment surrounding the image sensor 14 is dark), the processing means 11 can also be configured to carry out such steps again, but selecting a higher sensitivity value than the previous one as shooting parameter.

Alternatively or in combination with the increase in sensitivity value, the processing means 11 can also be configured to increase the number of images captured (for example from 5 to 10) so as to increase the amount of information available to extract the sensor fingerprint.

During the processing phase P4, the encrypting and/or decrypting operations of said confidential data can preferably be carried out by performing an exclusive bit to bit OR operation (bitwise-XOR) between said compressed fingerprint W and a string made up of at least said confidential data.

During the compression phase P3, the sensor fingerprints calculated during the fingerprint calculation phase P2 are compressed, using random projections (RP) technology. In other words, during each phase P3, the processing and control means of the user apparatus 1 are configured to carry out a set of instructions that implements a compression algorithm that exploits random projections technology.

This algorithm provides for compressing the registration and authentication sensor fingerprints with very little or ideally no loss of information. In greater detail, random projections technology is a powerful and not very complex method of dimensional reduction that is based on the idea of projecting the original n-dimensional data on an m-dimensional sub-space, with m<n, using a random matrix $\Phi \in R^{m \times n}$. Consequently, a fingerprint of the n-dimensional sensor $k \in R^n$ is reduced to an m-dimensional sub-space $y \in R^m$ through the following formula:

$$y = \Phi k \quad (8)$$

The key property that underpins RP technology is the Johnson-Lindenstrauss lemma (which is considered and integral part of this description), concerning low-distortion embeddings of points from high-dimensional into low-dimensional Euclidean space. The lemma establishes that a small set of points in a high-dimensional space can be embedded in a space of much lower dimensions so as to (almost) preserve the distances between the points.

Going by such an assumption, the user apparatus 1 can be configured to calculate a compressed version of each of the sensor fingerprints calculated by it through random projections, in other words through a multiplication (matrix product) between a compression matrix and a matrix that represents said sensor fingerprint (or vice-versa), where said compression matrix has a number of rows (or columns) smaller than that of the matrix that represents the sensor fingerprint.

The result of said product can be quantized, i.e., represented on a finite number of bits, in order to obtain a more compact representation of the compressed version of the sensor fingerprint. For example, a binary version of the compressed sensor fingerprint can be obtained through the following formula:

$$w = \text{sign}(y)$$

In other words, during the compression phase P3, said at least a portion of said encoding sensor fingerprint is encoded using an algorithm of random projections, so as to generate an encoded sensor fingerprint; after this, said encoded sensor fingerprint is quantized through the processing means 11, generating said compressed fingerprint W.

By doing so it is possible to generate a compressed version of the (registration or authentication) sensor fingerprint by storing and processing less data and, particularly, not requiring that the device 1 carries out the decrypting of the sensitive data without the security properties of the authentication system S undergoing a degradation. In this way, the reduction of the complexity in space allows the user apparatus 1 to have a limited use of resources, so that such an authentication system S can be used on a large number of user terminals. This makes it possible to increase the global security level, since it is possible to make an authentication system S using user terminals not necessarily of the latest generation.

Alternatively or in combination with what is described above, the security of the system can be further increased by the method for generating random projections since it is based on the use of a pseudo-random number generator that is initialized by a seed kept secret on the device of the user.

In greater detail, the method according to the invention can also comprise a random generation phase, in which a random bit string is generated, through the processing means, and where during the compression phase P3, said algorithm of random projections generates a set of random projections, preferably a BCCB (Block circulant with circulant blocks) type matrix, on the basis of said random bit string, so that during the processing phase P4, when the confidential data are encrypted, it is advantageously possible to use a compressed fingerprint generated with a new random bit string (seed).

The random bit string is preferably stored in the memory means 12,13 to allow a subsequent reuse when it is necessary to decrypt the confidential data. For this purpose, the method according to the invention can also comprise a random string reading phase, in which the random bit string stored in the memory means 12,13 is read, through the processing means 11, and where during the compression phase P3, the processing means 11 generate a set of random projections on the basis of said random bit string, so that during the processing phase P4, when the confidential data are decrypted, it is possible to reconstruct the compressed fingerprint used previously (for the encryption of the confidential data).

In this way, it is possible to increase the security of the authentication system, making it possible to manage the situation in which an attacker manages to fraudulently generate a fingerprint of the image sensor; indeed, by generating a new random bit string and using it to encrypt a new private key (and repeating the registration procedure) it is possible to take the authentication system S back into a secure state.

It should be highlighted that the fingerprint calculated during phase P2 and used by the user apparatus 1 to register at the application server 2 is (very probably) different from that which will be used for authentication. Indeed, it should also be highlighted that, since the sensor fingerprint is actually a measurement of a characteristic of the sensor, two distinct fingerprints determined at mutually distinct moments of time will struggle to be the same as one another, since they will be affected by noise as happens for every other measurement; indeed, the fingerprint generated during phase P2 is dependent on the amount of light that reaches the image sensor 14 when, during the image acquisition phase P1, the images are captured.

In order to avoid this noise compromising the operation of the authentication system S (with clear problems for security), the processing means 11 can be configured to carry out a set of instructions that implements a polar coding/decoding algorithm (like for example that described by Mandavifar et al. in "Achieving the secrecy capacity of wiretap channels using polar codes," *IEEE Transactions on Information Theory*, vol. 57, no. 10, pp. 6428-6443, October 2011) during the processing phase P4.

In particular, when it is necessary to encrypt the confidential data during the processing phase P4, the string of confidential data is encoded, through the processing means 11 using a polar coding, in such a way as to obtain a string of encoded confidential data, and said encoded confidential data are encrypted using the compressed fingerprint W as a key. On the other hand, when it is necessary to decrypt confidential data during the processing phase P4, said confidential data are decrypted obtaining encoded confidential data, and said encoded confidential data are decoded using a polar coding.

A polar coding/decoding makes it possible to correct the differences (errors) that are present between the version of the confidential data before the encryption and the version of said confidential data after the decryption with a margin of probability that can be tested, and that are due to the differences that can be present between the compressed sensor fingerprint used to encrypt the confidential data and the compressed sensor fingerprint used to decrypt said confidential data. This makes it possible to authenticate a user apparatus 1 using few images (even only one) with a probability of over eighty percent, whereas it makes it practically impossible to authenticate another user apparatus having a different image sensor or use publically available images shot by the same sensor and compressed with information loss methods (lossy), like for example JPEG or another format.

In this way, it is possible to improve the security of the authentication system S.

During phase P2, the (registration and authentication) sensor fingerprint is extracted by carrying out a set of instructions that implement a regression algorithm. In greater detail, the output of the sensor is preferably modelled as follows:

$$o = g^\gamma \cdot [(1+k) \cdot i + e]^\gamma + q, \quad (1)$$

where $g^\gamma$ is the gamma correction (g is different for each color channel and γ is normally close to 0.45), and models the noise sources inside the sensor, q models the noise outside said sensor (for example the quantization noise), whereas k models the sensor fingerprint (a matrix of the dimensions of the images produced by the image sensor 14) that it is wished to extract, i is the intensity of the light that hits the sensor. In order to extract k, the formula (1) can be approximated to the first term of the Taylor series:

$$o = o^{id} + o^{id} \cdot k + \tilde{e} \quad (2)$$

where $o^{id} = (gi)^\gamma$ is the ideal output of the image sensor, $o^{id} \cdot k$ is the photo-response non-uniformity (PRNU) of the image sensor from which it is wished to extract the fingerprint k, and $\tilde{e} = \gamma o^{id} \cdot e/i + q$ collects all the other noise sources.

Assuming that it is possible to produce a noiseless version $o^{dn}$ through a suitable filtering process and that such a noiseless version can be used instead of the ideal output $o^{id}$, then it is possible to write:

$$w = o - o^{dn} = o \cdot k + \tilde{q} \quad (3)$$

where q collects all the model errors. Assuming that a number of images C≥1 is available and considering q as a Gaussian noise independent from the signal o·k and having average zero and variance $\sigma^2$, it is possible to write for each image $\ell, \ell = 1, \ldots, C$ the following relationship:

$$w^{(\ell)}/o^{(\ell)} = k + \tilde{q}/o^{(\ell)}, \text{ where } w^{(\ell)} = o^{(\ell)} - o^{(\ell)dn} \quad (4)$$

where

Therefore, the estimate of k, i.e., the maximum likelihood estimate k̂, can be obtained as $$\hat{k} = \sum_{\ell=1}^{C} (w^{(\ell)} \cdot o^{(\ell)}) / \sum_{\ell=1}^{C} (o^{(\ell)})^2 \quad (5)$$

And the variance of this estimate is given by $$\sigma_{\hat{k}}^2 = \sigma^2 / \sum_{\ell=1}^{C} (o^{(\ell)})^2 \quad (6)$$

From which it is possible to note that the images from which the best sensor fingerprints can be extracted are the images having high luminance (but not saturated) and regular content (so as to lower the variance $\alpha^2$ of the noise q̃). In order to further improve the quality of the estimate k̂, the common artefacts between the image sensors of the same brand and/or model can be removed by subtracting the average values of the rows and of the columns from the values of the estimate k̂.

In the case in which the images captured by the image sensor 14 are in color, the estimate must be carried out separately for each color channel (red, green, blue), i.e., a maximum likelihood estimate must be obtained for each channel, i.e., $\hat{k}_R$ for the red channel, $\hat{k}_G$ or the green channel, and $\hat{k}_R$ for the blue channel. After this, a "global" fingerprint can be obtained by applying any conversion from RGB to grayscale, like for example the one given hereinafter:

$$\hat{k} = 0.3\hat{k}_R + 0.6\hat{k}_G + 0.1\hat{k}_B \quad (7)$$

It is however possible for those skilled in the art to use a different regression algorithm from the one just described above, without however moving away from the teachings of the present invention.

In order to further improve the quality of the sensor fingerprints extracted during the fingerprint calculation phase P2, each of the images, which is captured through the image sensor 14, can be filtered through a Wiener filter adapted for removing all of the periodic artefacts, before the sensor fingerprints are extracted (calculated). In other words, the processing and control means f the user apparatus 1 can also be configured to carry out, at the start of the fingerprint calculation phase P2, a set of instructions that applies the Wiener filtering algorithm to the images captured during the image acquisition phase P1 before the authentication sensor fingerprint is generated, in such a way as to remove all periodic artefacts from said images. In this way, the ability of the system S to distinguish between two fingerprints coming from two distinct image sensors is increased, thus increasing the security level of the authentication system S.

In combination with or alternatively to what is described above, during the compression phase P3 it is also possible to carry out a selection of the parts of the fingerprint (calculated during the fingerprint calculation phase P2) that have a (horizontal and/or vertical) spatial frequency higher than a threshold value.

In particular, during the compression phase P3, the processing and control means of the user apparatus 1 are configured to carry out the following steps:

transforming the fingerprint calculated during phase P2 inside a transformed domain, in such a way as to obtain a transformed fingerprint; for example carrying out a set of instructions that implements a transform algorithm, like the Discrete Cosine Transform (DCT) or the 2D Fast Fourier Transform (2D FFT), or other;

selecting the points of the transformed fingerprint that have a horizontal and/or vertical spatial frequency higher than a predetermined threshold value;

antitransforming said points of the selected transformed fingerprint, for example carrying out a set of instructions that implements an antitransform algorithm, like the Inverse Discrete Cosine Transform (DCT) or the 2D Inverse Fast Fourier Transform (2D IFFT), or other.

By doing so, a (registration and authentication) sensor fingerprint is obtained containing only the "high" frequency components. This becomes particularly advantageous when these frequency components are higher than the maximum frequencies that are contained in the compressed images using the widely used compression formats (like for example JPEG or other) and that are often used to publish self-produced content on the Internet. In this way, it is made impossible to generate a valid authentication sensor fingerprint starting from a set of images that have been shot from a same user terminal and that have then been published on the Internet (and also being aware of the seed used by the algorithm of random projections), since the frequency components of the fingerprint that are used by the system S to authenticate the user apparatus 1 are not present in the compressed images, thus increasing the security level of the authentication system S.

In combination with or alternatively to what is described above, the user apparatus 1 can comprise obstruction means (like for example a plug, a sliding flap or other) that, if actuated by the user of said user apparatus 1, can prevent the image sensor 14 from being lit, i.e., can prevent light from reaching the image sensor 14. This makes it possible to prevent the processing means 11 from generating (during phase P2) a valid sensor fingerprint, since during the image acquisition phase P1, the absence of light prevents the capturing of images with sufficient entropy to allow the extraction of the fingerprint of the image sensor 14.

In this way, the security of the authentication system S is increased by (physically) preventing an attacker from being able to generate a valid fingerprint to decrypt the confidential data also (remotely) taking control of the user apparatus 1.

In a variant of the invention described above, an image sensor similar to that of the preferred embodiment comprises processing means (like for example a CPU, a micro-controller or other) configured to perform the phases of the method according to the invention.

In this way, the security of the authentication system S is increased, since the embedding of the method according to the invention in already existing user apparatuses or in already completed user apparatus projects is simplified (for example through the replacement of the image sensor or the reprogramming thereof).

Some of the possible variants have been described above, but it is clear to those skilled in the art that, in the practical embodiment, there are also other embodiments, with different elements that can be replaced by other technically equivalent elements. The present invention is not therefore limited to the illustrative examples described, but can undergo various modifications, improvements, replacements of parts and of equivalent elements without moving away from the base inventive idea, as specified in the following claims.

The invention claimed is:

1. A method for protection of confidential data, comprising:

an image acquisition phase, wherein a plurality of images are captured by an image sensor;

a fingerprint calculation phase, wherein a sensor fingerprint is generated, by a processor, on the basis of said plurality of images captured during the image acquisition phase;

a compression phase, wherein at least a portion of said sensor fingerprint is encoded, by said processor, using an algorithm of random projections, in such a way as to generate a compressed fingerprint, the compressed fingerprint functioning as a compressed fingerprint key for encrypting or decrypting; and a processing phase, wherein, with regard to confidential data that comprise a private key of a private key/public key pair, either:

a string of said confidential data is encoded by said processor using a first polar coding, in such a way as to obtain a string of encoded confidential data, and said encoded confidential data are encrypted using said compressed fingerprint key, or said confidential data, having been previously encoded by a second polar coding, are decrypted using said compressed fingerprint key and are decoded using said second polar coding, wherein said first polar coding and said second polar coding protect said private key from noise affecting the sensor fingerprint.

2. The method according to claim 1, wherein, during the processing phase, the encoded confidential data are encrypted, wherein said method also comprises:

a random generation phase, wherein, by said processor, a random bit string is generated, and wherein during the compression phase, said algorithm of random projections generates a set of random projections on the basis of said random bit string.

3. The method according to claim 1, wherein during the processing phase, the encoded confidential data are decrypted, wherein said method also comprises:

a random string reading phase, wherein, by said processor, a random bit string stored in memory means is read, and wherein during the compression phase, said processor generates a set of random projections on the basis of said random bit string.

4. The method according to claim 1, wherein, during the compression phase, said at least one portion of said sensor fingerprint is encoded using an algorithm of random projections, so as to generate an encoded sensor fingerprint, and wherein said encoded sensor fingerprint is quantized through said processor, so as to generate said compressed fingerprint.

5. The method according to claim 1, wherein, during the compression phase, said processor performs the steps of:

transforming the generated sensor fingerprint inside a transformed domain during the fingerprint calculation phase, in such a way as to obtain a transformed fingerprint, selecting points of the transformed fingerprint that have a horizontal and/or vertical spatial frequency higher than a threshold value, and antitransforming said selected points of the transformed fingerprint.

6. The method according to claim 1, wherein, during the fingerprint calculation phase, a set of instructions is executed which, before the sensor fingerprint is generated, applies the Wiener filtering algorithm to each image captured during the image acquisition phase, in such a way as to remove all periodic artefacts from said plurality of images.

7. A user apparatus for protection of confidential data, comprising:
an image sensor adapted to capture images;
a processor in communication with said image sensor, wherein said processor is also configured to:
capture a plurality of images by means of said image sensor,
generate a sensor fingerprint on the basis of said plurality of images,
encode at least one portion of said sensor fingerprint using an algorithm of random projections, in such a way as to generate a compressed fingerprint, the compressed fingerprint functioning as a compressed fingerprint key for encrypting or decrypting, and
with regard to confidential data that comprises a private key of a private key/public key pair, either:
encode a string of said confidential data using a first polar coding, in such a way as to obtain a string of encoded confidential data, and encrypt said encoded confidential data using said compressed fingerprint key, or
decrypt said confidential data, having been previously encoded by a second polar coding, using said compressed fingerprint key, and decode said confidential data using said second polar coding, wherein said first polar coding and said second polar coding protect said private key from noise affecting the sensor fingerprint.

8. The user apparatus according to claim 7, comprising an obstructor adapted to prevent the image sensor from being lit.

9. An image sensor for user apparatus, comprising a processor and memory configured to:
capture a plurality of images by use of an image sensor;
generate a sensor fingerprint based on said plurality of images;
encode said sensor fingerprint into a compressed fingerprint using an algorithm of random projections, wherein the compressed fingerprint functions as a compressed fingerprint key for encrypting or decrypting; and
with regard to confidential data that comprise a private key of a private key/public key pair, either:
encode a string of said confidential data using a first polar coding, in such a way as to obtain a string of encoded confidential data, and encrypt said encoded confidential data using said compressed fingerprint key, or
decrypt said confidential data, having been previously encoded by a second polar coding, using said compressed fingerprint key, and decode said confidential data using said second polar coding, wherein said first polar coding and said second polar coding protect said private key from noise affecting the sensor fingerprint.

10. A computer program product comprising one or more hardware storage devices having stored thereon computer-executable instructions that are structured such that, when the computer-executable instructions are executed by one or more processors of an electronic computer, the one or more processors of the electronic computer is configured to:
capture a plurality of images by use of an image sensor;
generate a sensor fingerprint based on said plurality of images;
encode said sensor fingerprint into a compressed fingerprint using an algorithm of random projections, the compressed fingerprint functioning as a compressed fingerprint key for encrypting or decrypting; and
with regard to confidential data that comprises a private key of a private key/public key pair, either:
encode a string of said confidential data using a first polar coding, in such a way as to obtain a string of encoded confidential data, and encrypt said encoded confidential data using said compressed fingerprint key, or
decrypt said confidential data, having been previously encoded by a second polar coding, using said compressed fingerprint key, and decode said confidential data using said second polar coding, wherein said first polar coding and said second polar coding protect said private key from noise affecting the sensor fingerprint.

11. The method according to claim 1, wherein during the processing phase:
said string of said confidential data is encoded by said processor using said first polar coding, in such a way as to obtain said string of encoded confidential data, and said encoded confidential data are encrypted using said compressed fingerprint key, and
said encoded confidential data are decrypted using said compressed fingerprint key, and said encoded confidential data are decoded using said second polar coding.

* * * * *